UNITED STATES PATENT OFFICE.

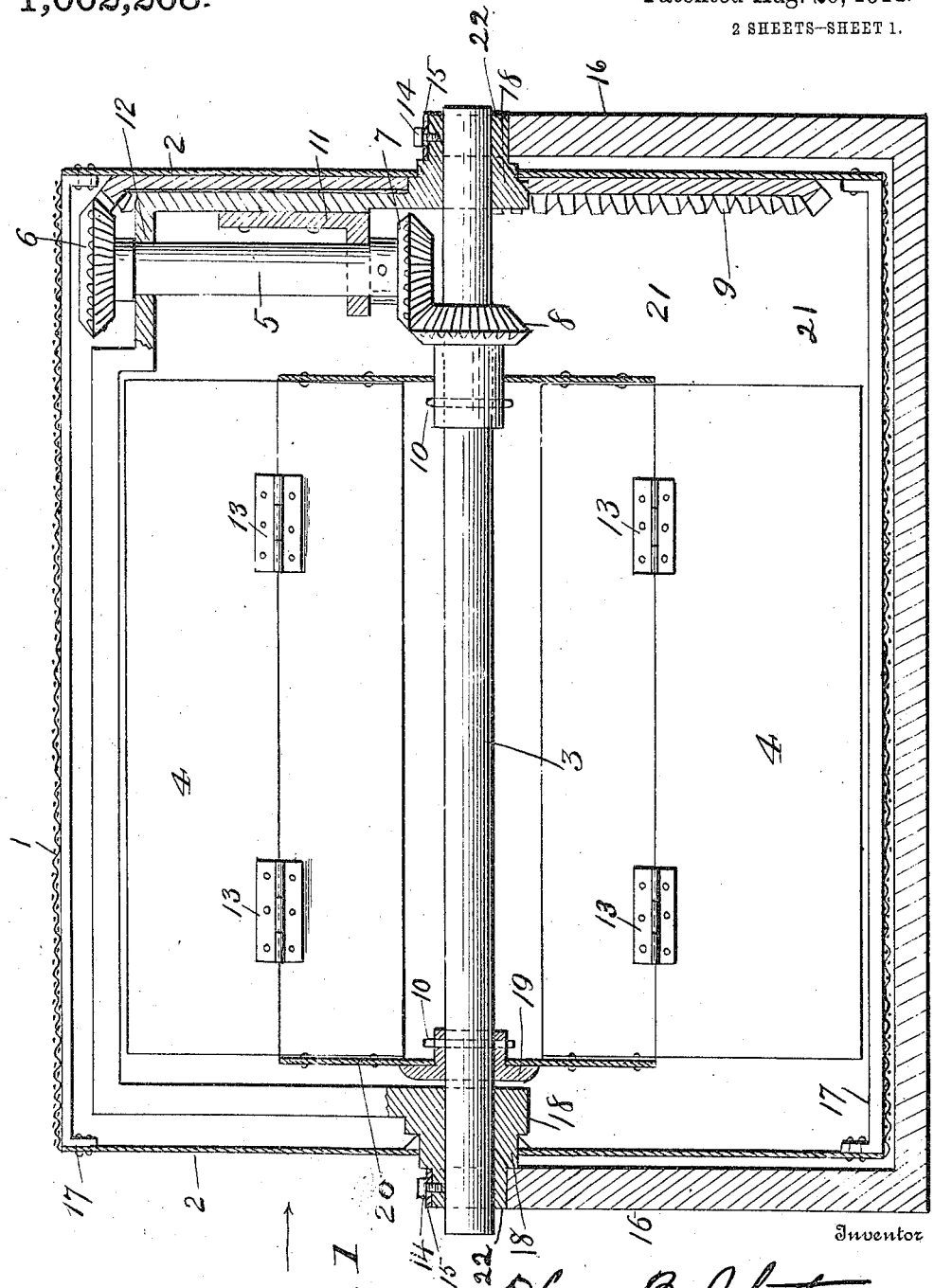

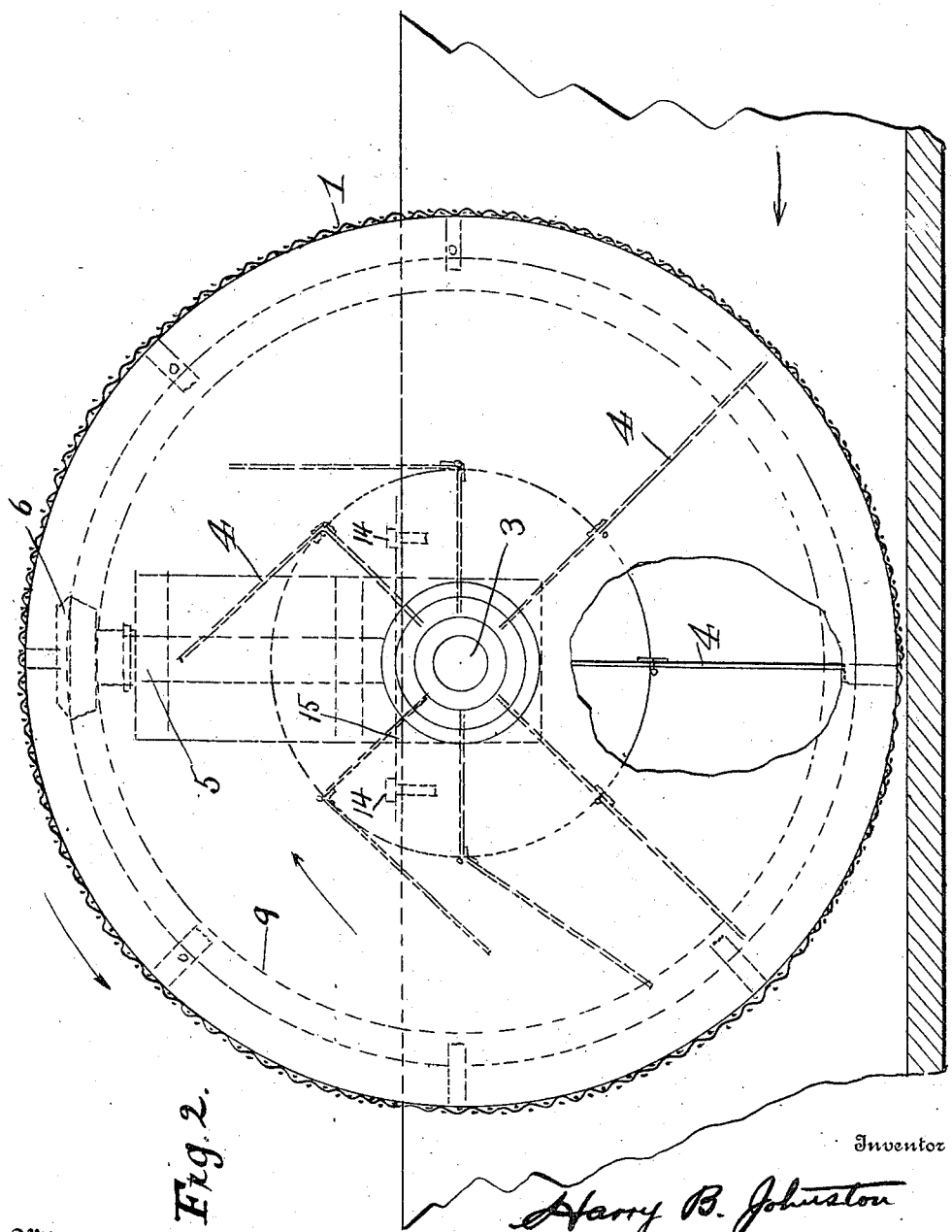

HARRY B. JOHNSTON, OF SALT LAKE CITY, UTAH, ASSIGNOR, BY MESNE ASSIGNMENTS, TO MODEL MANUFACTURING COMPANY, A CORPORATION OF UTAH.

DRUM-SCREEN FOR FISHWAYS.

1,002,208.          Specification of Letters Patent.     Patented Aug. 29, 1911.

Application filed February 12, 1907. Serial No. 357,050.

*To all whom it may concern:*

Be it known that I, HARRY B. JOHNSTON, a citizen of the United States, residing at Salt Lake City, in the county of Salt Lake and State of Utah, have invented certain new and useful Improvements in Drum-Screens for Fishways, of which the following is a specification.

My invention relates to a revolving drum screen for use in flumes, streams, fish-ways, or the like, where it is desired to prevent the passage of the fish therethrough but permit a free passage of the water.

A further object is to so construct the device that it may be easily and cheaply manufactured, will be durable, and can be removed or replaced in the ditch or stream with facility.

In addition to the foregoing advantages the device also permits weeds or other debris to pass over and beyond the same, and it is at the same time self-cleansing.

In the drawings forming a part of this specification, and in which like symbols of reference represent corresponding parts in the several views:—Figure 1 is a longitudinal section of the device; and, Fig. 2 is an end elevation, looking in the direction of the arrow, Fig. 1.

1 represents the screen netting of the device; 2 the drum; 3 shaft in same; 4 breakable folding paddle blades; and 5 a short shaft, carrying bevel gears 6 and 7, said gear 7 meshing with gear 8 on shaft 3. The gear 6 meshes with a large bevel gear 9, and operates the outer drum in a reverse direction to the flow of the water. Gear 9 is approximately four times the diameter of bevel gear 6, and is connected to the outside drum 1.

10 is a key connecting gear 8 with shaft of device.

11 is a shaft hanger for the purpose of hanging shaft 5 and is attached to an iron brace 12; 13 are hinges for paddles, and are for the purpose of allowing the paddles to break, fold or bend and thereby prevent any loss of power, by folding in its upward movement, or when it turns against the stream; 14 are bolts which hold the iron straps or hangers on the ends of brace 12, and hold said brace rigidly to the flume 16.

15 represents the iron straps or hangers which are held by said bolts 14 and 16 as before stated is the flume in which the screen is placed.

17 are the iron braces which hold the screen 1 and drum 2 together; 18 represents the rounded ends of brace 12 on which the outer drum revolves in an opposite direction to the paddle blades; 22 represents the outer ends of brace 12, which are preferably square, to be held firmly to the flume 16; and 19 is the collar which holds the paddle blades on shaft 3.

20 are circular plates to which the paddle blades are riveted, and which are attached to the shaft 3 by collar 19 and gear 8.

21 represents clear space at sides of paddle blades and side of drum for the purpose of allowing excess of water pressure to pass through the screen without coming in contact with paddle blades in case of flood or water.

The direction of the flow of water is indicated by arrows, which is the same direction as paddle blades turn; and the direction in which the outside drum turns, the latter being opposite to that of the former.

The operation of the device will be apparent from the foregoing.

The screen or other drum travels in the opposite direction from that of the paddle wheels, as before explained; and as all the driving mechanism is protected by being inclosed in the screen there is no obstruction on the outside of the drum whatever, the weeds or other debris passing over the drum, while the water passes through the same.

The device will operate in any depth of water with almost equal facility.

Having now fully described my invention, what I claim as new and desire to secure by Letters-Patent, is:—

1. In a device of the character described, a supporting frame, a shaft journaled in the same, a gear on said shaft, a supplemental shaft journaled in the main frame, gears on said shaft, an outer drum, and a gear on said drum, the gears of the supplemental shaft adapted to engage the gear of the drum and gear of the main shaft.

2. In a device of the character described, a main supporting frame, a shaft journaled in the same, a gear on said shaft, an outer drum, a gear on the same, a supplemental shaft carrying gears engaging the drum gear and the main shaft gear, circular plates, a collar, said circular plates connected to the main shaft by the collar and the hub of the bevel gear, and paddle blades connected to the circular plates.

In testimony whereof I affix my signature in presence of two witnesses.

HARRY B. JOHNSTON.

Witnesses:
C. S. PRICE,
EDWARD E. BURNHAM.